Sept. 15, 1936.   H. PAXTON   2,054,440
CLEAN-OUT FOR FRUIT TREATING MACHINES
Filed April 25, 1934
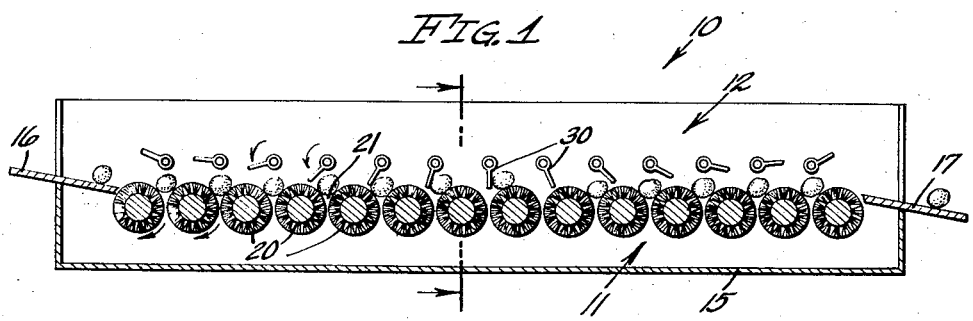
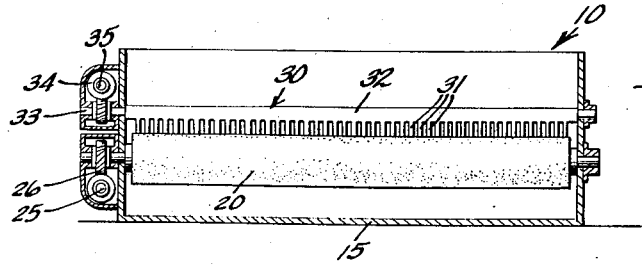
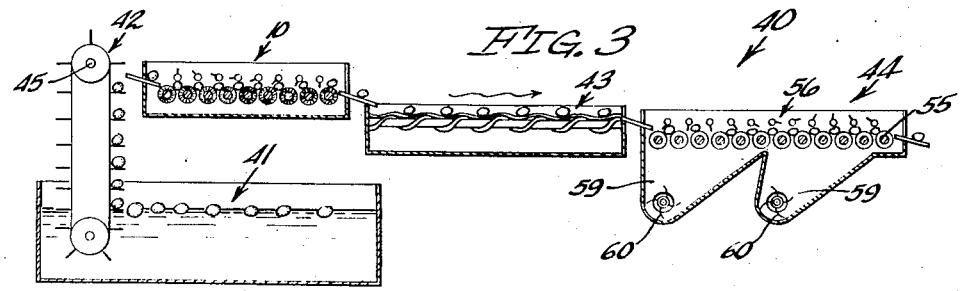
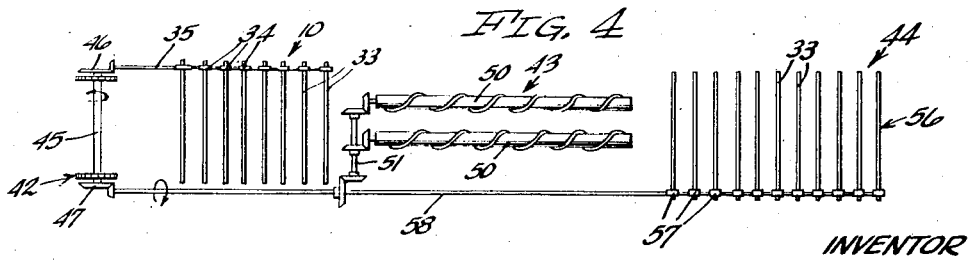
INVENTOR
HALE PAXTON
BY
ATTORNEY Patented Sept. 15, 1936

2,054,440

UNITED STATES PATENT OFFICE 2,054,440

CLEAN-OUT FOR FRUIT TREATING MACHINES

Hale Paxton, Santa Ana, Calif., assignor to Paxton Credit Corporation, Santa Ana, Calif., a corporation of California Application April 25, 1934, Serial No. 722,284

3 Claims. (Cl. 198—127)

My invention relates to machines employed by packing houses for treating fruits and vegetables in the preparation of these for market and more particularly to an improved type of clean-out mechanism to be used in combination with a fruit washing, drying, or polishing machine.

The type of fruit treating machine my invention is particularly adapted to be used with embodies a plurality of cylindrical elements slightly larger in diameter than the fruit to be treated, these elements being rotatably mounted on parallel, fixed axes lying in a given horizontal plane, thus closely spacing the elements so that a series of troughs or channels are provided by the combined upper surface of these elements for supporting rows of fruit while it is being washed, dried, polished or what not.

These elements are all rotated in the same direction so that fruit resting in any of said channels is continuously rotated. Fruit is fed into the machine by rolling it over the endmost element of the series away from which the upper surfaces of the elements travel owing to their rotation. After the first channel is occupied by a row of fruit, the next fruit fed to the machine engages the first occupants of the first channel, causing them to jump over the second rotating element into the second channel.

Continued feeding of fruit to the machine thus causes the stream of fruit to be advanced in the same manner from channel to channel through the entire machine. When the stream of fruit ceases as the last of a given lot is fed to the machine, it becomes necessary to clean out the fruit resting in the channels of the machine.

An object of my invention is to provide a mechanism for automatically cleaning out the residual fruit in a fruit treating machine.

Another object of my invention is the provision of a clean-out mechanism which will be positive and thorough and yet gentle in operation so as not to bruise or otherwise injure such perishable fruits as apples, oranges, and the like.

A further object of my invention is to provide a clean-out mechanism that will clean fruit out of each trough in a fruit treating machine before additional fruit is discharged into said trough so as to prevent contact of fruit in said troughs.

Other objects and advantages will be made manifest in the following description, taken in connection with the accompanying drawing, in which:

Fig. 1 is a longitudinal, vertical sectional view of a preferred embodiment of my invention.

Fig. 2 is a vertical sectional view taken on line 2—2 of Fig. 1.

Fig. 3 is a diagrammatic sectional view of a fruit treating apparatus including the machine shown in Fig. 1.

Fig. 4 is a diagrammatic plan view of a power transmitting apparatus employed in the apparatus shown in Fig. 3.

Referring specifically to the drawing, a fruit washing machine 10 comprising a preferred embodiment of my invention is shown in Fig. 1, this machine including a fruit washing unit 11 and a clean-out mechanism 12.

The washing unit 11 includes a frame formed of sheet metal to provide a tank 15 having intake and outlet boards 16 and 17 respectively at its opposite ends. Rotatably mounted in the tank 15 are brushes 20, the latter being closely spaced to provide troughs 21 therebetween. Journalled on one side of the tank 15 is a drive shaft 25 connected by suitable gearing 26 to each of the brushes 20 as shown in Fig. 2.

The cleanout mechanism 12 includes a plurality of rotatable pusher members 30, the latter being mounted vertically over the troughs 21 between the brushes 20. Each of the pushers 30 are formed of rubber to provide a row of equally spaced tines 31 formed integral with a sleeve portion 32, the latter receiving a shaft 33 which is driven through suitable gearing 34 by a drive shaft 35. As shown in Fig. 1, each of the pushers 30, starting at the inlet end of the tank 15, is set slightly in advance of the next pusher.

Referring now to Figs. 3 and 4, I have shown therein the washer 10 in its relation to a complete fruit washing and drying apparatus 40, the latter including a soaking tank 41, an elevator 42, the washer 10, a water eliminator 43 and a drying unit 44.

The elevator 42 has a power driven shaft 45 with bevel gears 46 and 47 at its opposite ends as shown in Fig. 4. The washer 10 is positioned to receive fruit from the elevator 42, the shaft 35 which drives the pusher members 30 of the washer being geared to the bevel gear 46 of the elevator 42.

The water eliminator 43 is positioned to receive fruit from the washer 10 and includes a pair of spiral drums 50 geared to a common drive shaft 51. A complete disclosure of the water eliminator 43 may be had by reference to the patent to Byington, No. 1,783,700. The drier 44 positioned adjacent the eliminator 43 is substantially similar to the washer 10 excepting that absorbent cylindrical drying elements 55 are used in place of the brushes 20 of the washer 10. Mounted in the unit 44 is a clean-out mechanism 56 which is identical with the clean-out 12 of the washer 10. The pushers 30 of the drier 44 are driven through suitable gearing 57 by a shaft 58, the latter being driven by the bevel gear 47 of the elevator shaft 45 as shown in Fig. 4. Rotatably mounted in wells 59 below the elements 55 of the drier 44 are blowers 60. The drums 50 of the water eliminator 43 are also driven from the shaft 58 as shown.

The brushes 20 of the washer 10 and the drying cylinders 55 of the drier 44 are driven independently at constant rates of speed while the elevator 42, clean-out mechanisms 12 and 56 of the washer 10 and drier 44 respectively, and the water eliminator 43 are interconnected so that any change in speed of the elevator 42 will correspondingly change the rate of travel of fruit through the units 10, 43, and 44. It is thus clear that the apparatus 40 can be easily slowed down for fruit that requires a longer soaking and washing period and speeded up when handling relatively clean fruit.

I claim as my invention:

1. In combination: a series of substantially cylindrical parallel brushes disposed in a common plane; means for feeding fruit onto the upper surfaces of said brushes at one end of said series; means for receiving fruit from said brushes at the opposite end of said series; means for rotating said brushes at a relatively high velocity in a given direction so that the upper surfaces of said brushes turn away from said fruit feeding means and toward said fruit receiving means; a series of rotary clean-out members, each of which is rotatably mounted over a valley between a pair of adjacent brushes of said series, each of said clean-out members having a hub portion and a blade portion extending in a single direction from said hub portion; means for rotating said clean-out members at a relatively slow uniform rate of speed in the opposite direction from that in which said brushes are rotating; the blade portions of said clean-out members extending from said body portions at angles which cause said blade portions to clean out fruit from their respective valleys so that with each clean-out operation by an individual clean-out member, the fruit disposed in the valley thereberneath is discharged from said valley forwardly into the next succeeding valley after the fruit has been cleaned out from said last mentioned valley by the clean-out member disposed thereover.

2. In combination: a series of substantially cylindrical parallel brushes disposed in a common plane; means for feeding fruit onto the upper surfaces of said brushes at one end of said series; means for receiving fruit from said brushes at the opposite end of said series; means for rotating said brushes at a relatively high velocity in a given direction so that the upper surfaces of said brushes turn away from said fruit feeding means and toward said fruit receiving means; a series of rotary clean-out members, each of which is rotatably mounted over a valley between two adjacent brushes of said series, each of said clean-out members having a hub portion and a blade portion extending in a single direction from said hub portion; means for rotating said clean-out members at a relatively slow uniform rate of speed in the opposite direction from that in which said brushes are rotating, the blade portion of each clean-out member being slightly angularly advanced in the direction of its rotation as compared with the angular position of the clean-out member immediately preceding it.

3. In combination: a series of substantially cylindrical parallel brushes disposed in a common plane; means for feeding fruit onto the upper surfaces of said brushes at one end of said series; means for receiving fruit from said brushes at the opposite end of said series; means for rotating said brushes at a relatively high velocity in a given direction so that the upper surfaces of said brushes turn away from said fruit feeding means and toward said fruit receiving means; a series of rotary clean-out members, each of which is rotatably mounted over a valley between two adjacent brushes of said series, each of said clean-out members having a hub portion and a blade portion extending in a single direction from said hub portion, said hub portion being spaced from the surfaces of said pair of brushes a distance equal to or greater than the radius of said brushes; and means for rotating said clean-out members at a relatively slow uniform rate of speed in the opposite direction from that in which said brushes are rotating, the blade portion of each clean-out member being slightly angularly advanced in the direction of its rotation as compared with the angular position of the clean-out member immediately preceding it.

HALE PAXTON.